(12) United States Patent
Shetty et al.

(10) Patent No.: US 8,095,987 B2
(45) Date of Patent: Jan. 10, 2012

(54) SOFTWARE ANTI-PIRACY PROTECTION

(75) Inventors: Satish K. Shetty, Redmond, WA (US); Michelle L. Holtmann, Covington, WA (US); Wei Jiang, Redmond, WA (US); Wen-Pin Scott Hsu, Redmond, WA (US); Wen Wha Lee, Bellevue, WA (US); Qiong Tang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 12/203,929

(22) Filed: Sep. 4, 2008

(65) Prior Publication Data

US 2010/0058478 A1     Mar. 4, 2010

(51) Int. Cl.
*G06F 11/00*     (2006.01)
*H04L 9/32*     (2006.01)

(52) U.S. Cl. .................. 726/26; 726/22; 726/23

(58) Field of Classification Search ............. 726/22–26, 726/31–33; 713/187–188; 705/56–59
See application file for complete search history.

(56) References Cited

U.S. PATENT DOCUMENTS

| | | | |
|---|---|---|---|
| 5,790,664 | A | 8/1998 | Coley et al. |
| 6,941,478 | B2 | 9/2005 | Card et al. |
| 2002/0138441 | A1* | 9/2002 | Lopatic ............. 705/59 |
| 2003/0212639 | A1 | 11/2003 | Cronce et al. |
| 2003/0233547 | A1 | 12/2003 | Gaston et al. |
| 2004/0143746 | A1 | 7/2004 | Ligeti et al. |
| 2005/0044359 | A1 | 2/2005 | Eriksson et al. |
| 2005/0246537 | A1* | 11/2005 | Gunyakti et al. ............. 713/176 |
| 2006/0259974 | A1 | 11/2006 | Marinescu et al. |
| 2007/0078769 | A1 | 4/2007 | Way |
| 2007/0143847 | A1 | 6/2007 | Kraemer et al. |

OTHER PUBLICATIONS

Greensmith, et al, "Firewalls, Intrusion Detection Systems and Anti-Virus Scanners", Computer Science Report No. NOTTCS-TR-2005-1, Jun. 21, 2004, pp. 17.
"Microsoft's Software Protection Platform: Protecting Software and Customers from Counterfeiters", Retreived at<<http://www.microsoft.com/presspass/features/2006/oct06/10-04SoftwareProtection.mspx>>, May 26, 2008, pp. 1-2.
"Top Five Data Security Vulnerabilities Identified to Promote Merchant Awareness", Retreived at<<http://www.uschamber.com/NR/rdonlyres/eyzkc6zyokejn5n64o7vpmgvqxyd7dodczrpuc5tpqzoinz5gq7mpy3puuct43h6cgtr4kf3hmpx6hugw5kiktflzyh/top_5_alert.pdf>>, Aug. 29, 2006, pp. 4.

* cited by examiner

*Primary Examiner* — Hosuk Song
(74) *Attorney, Agent, or Firm* — Capitol City TechLaw; Richard C. Irving

(57) ABSTRACT

Licensing aspects of vendor software packages can be protected with reduced user interaction and effort by automating licensing exploit identification, and if allowed, exploit correction. Automating licensing exploit detection ensures that known exploits are more quickly and efficiently discovered to help maintain genuine software status. Minimizing user interaction in licensing exploit detection and correction involves less disruption to users and generally supports increased user satisfaction with vendor software package usage.

20 Claims, 11 Drawing Sheets

SOFTWARE ANTI-PIRACY PROTECTION

BACKGROUND

Software piracy and counterfeiting is a pervasive, expensive problem for software development companies, i.e., vendors, as well as consumer and corporate users, collectively users. By most definitions pirated software is software that is improperly licensed or not licensed at all and counterfeit software is software that is deliberately presented as genuine when it is not.

There are a number of known ways for users to obtain unlicensed, counterfeit or pirated software, collectively referred to herein as pirated software. A common method is for a user, or distributor, to obtain a counterfeit product key from a web site and use the counterfeit product key with software obtained through improper channels, i.e., friends, unauthorized download sites, etc. Counterfeit product keys are fake product keys, i.e., product keys that appear to be authentic but have not been generated by the appropriate software vendor, and stolen product keys, i.e., product keys that have been stolen from legitimate copies of protected software packages by, for example, copying them from the sticker on the software package product box or a sticker on a user's computing device. Counterfeit product keys are used to improperly bypass licensing and activation mechanisms present in vendor software.

Another common method for a user to obtain pirated software is to download a key generator from a web site or peer-to-peer network and use the key generator to generate a product key for use with software obtained through an improper channel. Keys so generated are used to improperly bypass licensing and activation mechanisms present in vendor software.

Downloading crack tools from web sites and peer-to-peer networks and using the crack tools with software obtained through improper channels is another known method for obtaining and using pirated software. Crack tools are programs that tamper with the vendor's software to bypass licensing and activation mechanisms. Examples of known crack tools include programs that delete timers in vendor software so that the software is always in the grace period, when licensing activation is not required, and programs that tamper with vendor binaries responsible for enforcing licensing and activation mechanisms.

Other known methods of obtaining and using pirated software include downloading full software copies from web sites or peer-to-peer networks, obtaining physical media containing the software for sale over the internet and obtaining physical media containing the software for sale from street vendors and distributors.

It has been estimated by at least one source that thirty-five percent of the world's software is pirated. The Business Software Alliance (BSA) has estimated that software vendors and associated support and service organizations lose as much as fifty billion dollars ($50 billion) annually to software piracy.

Software piracy therefore is a significant issue for software vendors. Not only are software vendors losing enormous amounts of money to pirated software but such pirated software violates vendors' intellectual property rights, creates incompatibility problems and engenders myriad service and support issues.

Software piracy also has its detrimental effects on users. Software piracy creates risks of network downtime and data loss when the pirated software malfunctions. Technical service, support and interoperability issues involving pirated software generally take longer to resolve, at a monetary cost to users. Users that knowingly or unwittingly use pirated software are at increased risk of fines and/or costly litigation. Pirated software has also increasingly been found to contain viruses, spyware and/or other malware detrimental to user's systems and data. Moreover, non-genuine software raises incompatibility risks and issues with the counterpart legitimate software package patches, fixes and updates.

Thus, it would be desirable to design a system and methodology for implementing seamless anti-piracy protection for one or more software packages, i.e., protected software packages, installed and/or operating on user computers and computing-based devices, e.g., BLACKBERRY® hand-held devices, computer-based cell phones, etc., collectively referred to herein as computing devices. It would be desirable for anti-piracy protection to be effective in identifying and correcting, or replacing, exploited software, i.e., those licensing portions of a user's protected software package that are not genuine, while requiring little to no interaction with a user and as little disruption to a user as is necessary. It would further be desirable to track piracy events for diagnosing piracy trends.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodologies for identifying and correcting, or otherwise removing or disabling, identified software breaches, or exploits, to licensing aspects of vendor software packages available to one or more users. Embodiments discussed herein also include systems and methodologies for identifying and correcting, or otherwise removing or disabling, identified software breaches, or exploits, to the system and methodology itself.

Embodiments discussed herein include automatically and periodically identifying and removing software exploits by automatically and periodically updating definitions, e.g., signatures, for known exploits and by automatically and periodically checking the integrity of the licensing and validation components of a vendor software package to ensure these components are present and operating as intended.

BRIEF DESCRIPTION OF THE DRAWINGS

These and other features will now be described with reference to the drawings of certain embodiments and examples which are intended to illustrate and not to limit the invention, and in which.

DETAILED DESCRIPTION

In the following description, for purposes of explanation numerous specific details are set forth in order to provide a thorough understanding of the present invention. It will be apparent, however, to one skilled in the art that the invention may be practiced without these specific details. In other instances well-known structures and devices are shown in block diagram form in order to avoid unnecessarily obscuring the invention. Any and all titles used throughout are for ease of explanation only and are not for use in limiting the invention.

Figure 1:
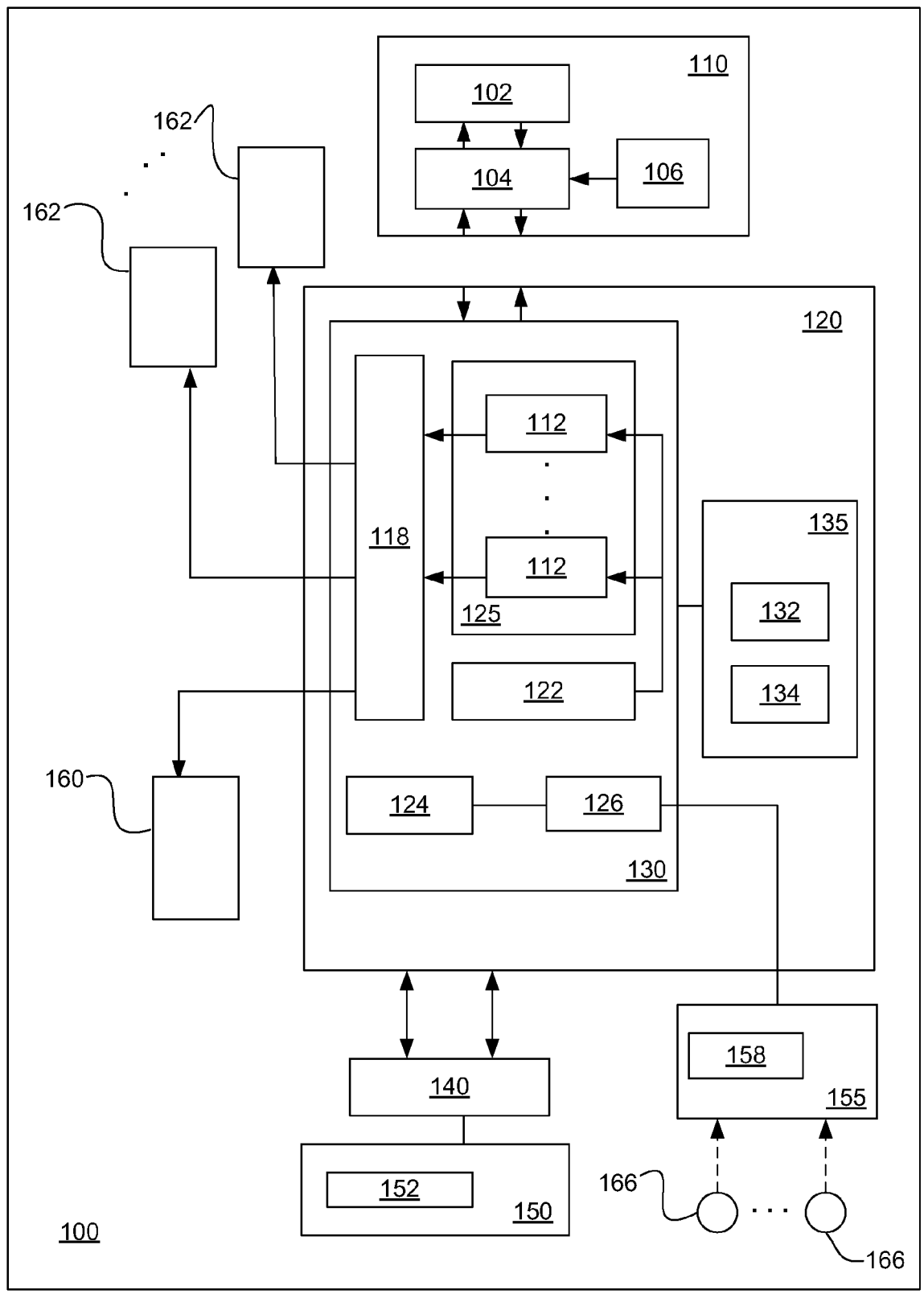
FIG. 1 depicts an embodiment software anti-piracy system for identifying, tracking and remedying exploited software.

FIG. 1 shows an embodiment architecture for a software anti-piracy system 100 for protecting the licensing components, or aspects, of a software package that can operate, or otherwise execute, on a user's computing device, i.e., a protected software package. In an embodiment the software anti-piracy system 100 is used when a protected software package is first activated and thereafter whenever the protected software package is validated.

In an embodiment activation helps ensure that the proper, genuine, product key is being used with the correct protected software package edition and/or distribution. In an embodiment activation occurs once, when a user first loads a protected software package to their computing device, or during or at the end of the grace period for a protected software package already loaded to and operating on a user's computing device.

In an embodiment validation helps confirm a protected software package is activated and remains properly licensed when, e.g., content for the protected software package is downloaded and updates are rendered to the protected software package.

In an embodiment all editions and distributions of a protected software package, including those obtained through a volume license program, are to be activated within a predetermined grace period. In an embodiment activation involves registering a product key for the protected software package. In an embodiment each edition and distribution of a protected software package has a unique product key. In other embodiments editions and distributions of a protected software package obtained through a volume license program share the same product key. In an embodiment the predetermined grace period is thirty (30) days. In other embodiments the predetermined grace period is other time intervals. In an alternative embodiment all editions and distributions of a protected software package are to be activated before any initial use.

In an embodiment activation the product key is provided by a user of the protected software package via the logged on user account 110. In an embodiment the genuine advantage service component 130, also referred to herein as a GA Service 130, of the software anti-piracy system 100 receives the product key provide by the user and validates the product key, i.e., checks to ensure that it is a valid product key for the user's protected software package, via one or more validators 112 of the GA Service 130's validation provider component 125. In an embodiment each validator 112 is responsible for a protected software package, e.g., but not limited to, Windows Office®, Vista®, etc.

In an embodiment the respective validator 112 for the current protected software package communicates via a user replacement 118 with a database 162, e.g., a product activation (PA) database or a Global Foundation Service (GFS) database, to determine whether or not the user product key is valid, i.e., genuine. If the user product key is genuine the respective validator 112, again via the user replacement 118, stores validation data regarding the product key and current protected software package on one or more databases 162, for future use in validating the current protected software package. In an embodiment the validation data includes an association of the product key with the hardware key for the user's computing device.

In an embodiment the user replacement 118 is software for mirroring the logged on user in order to gain access to the databases 162 for license activation and validation. In an embodiment the user replacement 118 communicates with one or more of the databases 162 using user proxy information, i.e., credentials of the user currently logged onto the user's computing device, gleamed from the logged on user account 110 in order to successfully negotiate firewalls, etc., in order to properly access the one or more databases 162.

In an embodiment validation the GA Service 130 checks whether the protected software package contains any known exploit software that circumvents or tampers with proper activation, validation and licensing of the protected software package. In an embodiment, if the protected software package has one or more software exploits, via, e.g., an update, etc., and the exploit(s) are to licensing aspects of the software package external to the software anti-piracy system 100, referred to herein as external exploit software, the GA Service 130 will, upon detection, notify the user of the exploit(s) and request the user allow the exploit(s) to be disabled or removed. In an embodiment, if one or more known software exploits are found in one or more components of the software anti-piracy system 100, referred to herein as internal exploit software, the GA Service 130 will automatically correct, replace, disable or remove the internal exploit software without user notification or agreement.

As noted, in an embodiment the software anti-piracy system 100 includes a GA Service 130 that is responsible for coordinating the efforts of the software anti-piracy system 100, including activating protected software packages; validating protected software packages; ensuring all current hack signatures, i.e., definitions for correcting exploit software, are accessible to the components tasked with searching for and correcting licensing exploit software; and, ensuring that the software anti-piracy system 100 periodically searches for, and corrects as needed and allowed, discovered hacks, i.e., breaches or exploit software, that tamper with licensing components of a protected software package.

In an embodiment the software anti-piracy system 100 includes a network service component 120 responsible for software license validation, breach identification and breach removal. In an embodiment the network service component 120 includes a breach removal tool (also referred to herein as a BRT) 135 which is a software executable responsible for searching for hacks, i.e., breaches or software exploits, into the licensing component of a protected software package operating on a user's computing device and, if allowed, correcting, or otherwise removing, discovered hacks from the protected software package.

In an embodiment the BRT 135 has, or is otherwise associated with, a database, or other collection, of hack signatures 134. In an embodiment a hack signature is a definition file to correct, or otherwise replace, a known hack, i.e., breach or exploit software. As new hacks, i.e., breaches or exploit software, are discovered corresponding hack signatures are developed to correct, or otherwise replace, these new hacks. Newly developed and/or updated hack signatures are pushed through the system, as further explained below, and stored in a hack signature database 134, or otherwise associated with the BRT 135.

In an embodiment the BRT 135 has a breach engine 132 that searches for known external hacks, or external software exploits, in, e.g., but not limited to, one or more binaries, used to protect the licensing aspects, e.g., but not limited to, product keys, grace period intervals, etc., of a protected software package. In an embodiment, if one or more external hacks is discovered the breach engine 132 is involved in communicating with a user of the computing device hosting the protected software package to notify the user that the software is not genuine, i.e., one or more of the protected software package's licensing components has been improperly or unknowingly tampered with and contains at least one external software exploit. In an embodiment the breach engine 132 will correct, or otherwise replace, one or more discovered external hacks if the user approves of, or otherwise agrees to, the protected software being fixed.

In an embodiment the breach engine 132 will take no action on any discoverable external hack of a protected software package if the user does not provide approval for the requested external hack fix(es). In an embodiment in this scenario the software anti-piracy system 100 displays period reminders to the user that the protected software package hosted on the user's computing device is non-genuine and requests that the user allow the discovered external software exploits be disabled or otherwise removed or replaced. In an alternative embodiment in this scenario the software anti-piracy system 100 permanently displays a message to the user that the protected software package hosted on the user's computing device is non-genuine.

In an embodiment in this scenario the user of non-genuine software is directed to reactivate the protected software package within a preset time interval, e.g., thirty (30) days, if the product key has been blocked by the software vendor or any external software exploit has been discovered in the protected software package. In this embodiment and scenario, a user's failure to reactivate the protected software package within the preset time interval results in the protected software package being placed in a reduced functionality mode where, e.g., all non-critical updates to the protected software package are blocked, etc.

In an embodiment the breach engine 132 also searches for known hacks to the BRT 135, i.e., to the breach engine 132 itself and to the hack signature database 134, i.e., internal hacks or software exploits. In an embodiment, if one or more internal hacks to the BRT 135 are found the breach engine 132 automatically attempts to disable or correct the hacked software, or otherwise replace the hacked software with genuine BRT 135 software, using the hack signature database 134. In an embodiment, if one or more internal hacks to the BRT 135 are found and the breach engine 132 fails to successfully correct or otherwise replace the internal exploit software using the hack signature database 134, the breach engine 132 communicates with an update service component 155 of the software anti-piracy system 100, via the GA Service 130, to have an update installer stub 158 patch, or otherwise correct or replace, the breach engine 132 or the internal exploited software portions of the breach engine 132.

In an embodiment the breach engine 132 also searches for known hacks to the GA service 130. In an embodiment, if one or more internal hacks to the GA Service 130 are found the breach engine 132 automatically attempts to disable or correct the internal hacked software, or otherwise replace the internal hacked software with genuine GA Service 130 software, using the hack signature database 134. In an embodiment, if one or more internal hacks to the GA Service 130 are found and the breach engine 132 fails to successfully correct or otherwise replace the internal exploit software using the hack signature database 134, the breach engine 132 communicates with the update service component 155 of the software anti-piracy system 100, via the GA Service 130, to have an update installer stub 158 patch, or otherwise correct or replace, the GA Service 130 or the internal exploited software portions of the GA Service 130.

As noted, in general the GA Service 130 is responsible for coordinating the efforts of the software anti-piracy system 100, including activating and validating protected software packages, ensuring all available hack signature updates are pushed onto the BRT 135, i.e., stored and accessible in the hack signature database, or collection, 134, and ensuring the BRT 135 periodically looks for and disables or otherwise corrects as needed and allowed discovered hacks.

In an embodiment an updater 124 of the GA Service 130 periodically checks for any new and/or updated hack signatures that have been generated since the last check. In an embodiment the updater 124 checks for new and/or updated hack signatures once every twenty-four (24) hours. In alternative embodiments the updater 124 checks for new and/or updated hack signatures in other periodic time intervals, including, but not limited to, once a week, once a month, once every twelve (12) hours, once every sixty (60) minutes, etc.

In an embodiment the updater 124 communicates via an automated update client interface 126 with the update service component 155 of the software anti-piracy system 100. In this embodiment the updater 124, via the automated update client interface 126, identifies any new and/or updated hack signatures generated and stored in one or more repositories 166 and accesses the new and/or updated hack signatures for pushing onto the BRT 135.

In an embodiment the update installer stub 158 of the update service component 155 patches, or otherwise corrects or replaces, the breach engine 132 if one or more known internal hacks to the breach engine 132 are discovered and correctable or replacement software has been generated. In an embodiment the update installer stub 158 patches, or otherwise corrects or replaces, the breach engine 132 when the breach engine 132 notifies the update service component 155, via the GA Service 130, that it itself contains exploit software. In an embodiment the update installer stub 158 patches, or otherwise corrects or replaces, the breach engine 132 when the update service component 155 identifies one or more hack signatures for the breach engine 132 in the one or more repositories 166.

In an embodiment the update installer stub 158 patches, or otherwise corrects or replaces, one or more components of the GA Service 130 if one or more known internal hacks to any portion of the GA Service 130 are discovered and correctable or replacement software has been generated. In an embodiment the update installer stub 158 patches, or otherwise corrects or replaces, one or more components of the GA Service 130 when the breach engine 132 notifies the update service component 155, via the GA Service 130, that the GA Service 130 contains exploit software. In an embodiment the update installer stub 158 patches, or otherwise corrects or replaces, one or more components of the GA Service 130 when the update service component 155 identifies one or more hack signatures for the GA Service 130 in the one or more repositories 166.

In an embodiment the update installer stub 158 is responsible for ensuring any new and/or updated hack signatures in the one or more repositories 166 are pushed onto the BRT 135 when periodically notified for updates by the updater 124 via the automated update client interface 126.

In an embodiment, when the BRT 135 is first launched and when one or more situations are identified, including but not limited to, a catastrophic deterioration of the BRT 135, the update service component 155 uploads, or otherwise installs, the breach engine 132 to the network service component 120 and populates the hack signature database, or collection, 134 with all currently known hack signatures identified in the one or more repositories 166.

The logged on user account 110 is the software managing a currently logged on user. In an embodiment logged on user account 110 a validation application 104 communicates with the network service component 120 and is responsible for communicating with the appropriate validator 112 to activate, and thereafter, as needed, validate a protected software package. In an embodiment a validation controller 106 enables computing devices operating with various internet access software, e.g., but not limited to, Netscape®, Firefox®, etc., to properly interact with the network service component 120 and allow a logged on user visual access to what, if any, issues are discovered with the licensing of a protected software package.

In an embodiment a notifier 102 communicates with a user regarding, or otherwise provides the user visual and/or audio access to, any discoverable issues with the licensing of a protected software package installed on the user's computing device. In an embodiment, if an external hack is discovered the notifier 102 communicates the issue to the user and requests the user allow the external exploit software to be disabled, fixed or otherwise replaced. In this embodiment the notifier 102 forwards any user response to the network service component 120, where the breach engine 132 then takes the appropriate, if any, action on any discoverable external exploit software.

In an embodiment the GA Service 130 has a telemetry handler 122 responsible for gathering various status and data, i.e., telemetry, on the current protected software package and user computing device and storing the telemetry on one or more telemetry servers 160. In an embodiment telemetry gathered by the telemetry handler 122 is uploaded to one or more telemetry servers 160 via HTTP (Hypertext Transfer Protocol), which is a known communications protocol for transferring information on the internet. In an embodiment there are two (2) HTTP requests made to upload a telemetry event, i.e., telemetry for a particular validation check of a protected software package—HTTP GET and HTTP POST.

In an embodiment telemetry is only stored on a telemetry server 160 when there is an apparent validation state, i.e., licensing, issue with the protected software package or an update is made to a licensing component of the protected software package or any software of the network service component 120, i.e., a telemetry event. In an embodiment telemetry for an event is only uploaded to a telemetry server 160 once. In an embodiment when the telemetry handler 122 has an event, i.e., telemetry for a particular validation check of a protected software package, the telemetry handler 122 first compares the event to a previously cached event hash to ensure that the present event is new, i.e., it has not previously been uploaded to a telemetry server 160. In an embodiment, if the telemetry event has previously been uploaded the telemetry handler 122 will not re-upload the event. In an embodiment, if the event has not been previously uploaded the telemetry handler 122 will upload the event to one or more telemetry servers 160 and update a cached event hash to provide an indicator that the event has been uploaded.

In an embodiment the telemetry handler 122 gathers the following configuration information for an event: computing device make and model; version information for the operating system; version information for the software anti-piracy system 100; region and language settings on the computing device; the GUID (globally unique identifier) assigned the computing device; product ID and/or product key assigned the protected software package; BIOS name, revision number and/or revision date for the protected software package; and, volume serial number. In other embodiments the telemetry handler 122 gathers a subset of this configuration information, this configuration information and additional data, or different configuration information, which can include a subset of this configuration information.

In an embodiment, in addition to configuration information the telemetry handler 122 includes status information in a telemetry event entry. In an embodiment the status information provides an indication of whether or not a protected software package installation was successful, if the telemetry event is associated with the installation of the protected software package, and the result of a current validation check of the protected software package. In other embodiments the status information provides a subset of this status information, additional status information or different status information.

In an embodiment any gathered telemetry data is used to understand the geography of software piracy affecting protected software. No personally identifiable information is collected by the telemetry handler 122.

In an embodiment the software anti-piracy system 100 has an admin management interface, also referred to herein as AMI, 150 for allowing system administrators to see licensing status information across their responsible network. In an embodiment the AMI 150, via its management instrumentation component 152, affords system administrators the ability to understand the licensing status of their network and allow software exploit repair, disablement or replacement, to protected software packages associated with their network that have identified licensing issues. In an embodiment the AMI 150 communicates with the network service component 120, via an API 140, using RPC (Remote Procedure Calls), a known inter-process communications technology.

In an embodiment a system administrator, via the AMI 150, can disable validation of protected software packages on one or more computing devices in their responsible network. In an embodiment a system administrator, via the AMI 150, can disable notifications to one or more computing devices in their responsible network that a protected software package installed on a computing device(s) in the responsible network, or otherwise accessible thereto, is deemed non-genuine.

In an embodiment, again via the AMI 150, a system administrator can set system-level policies, via one or more templates, to ensure specified events, e.g., software package updates, software package validation attempts, software package validation failures, etc., are logged. In this embodiment a system administrator has greater flexibility to manage the responsible network by providing automatic routine monitoring of the environment for one or more identified events.

Figure 2A:
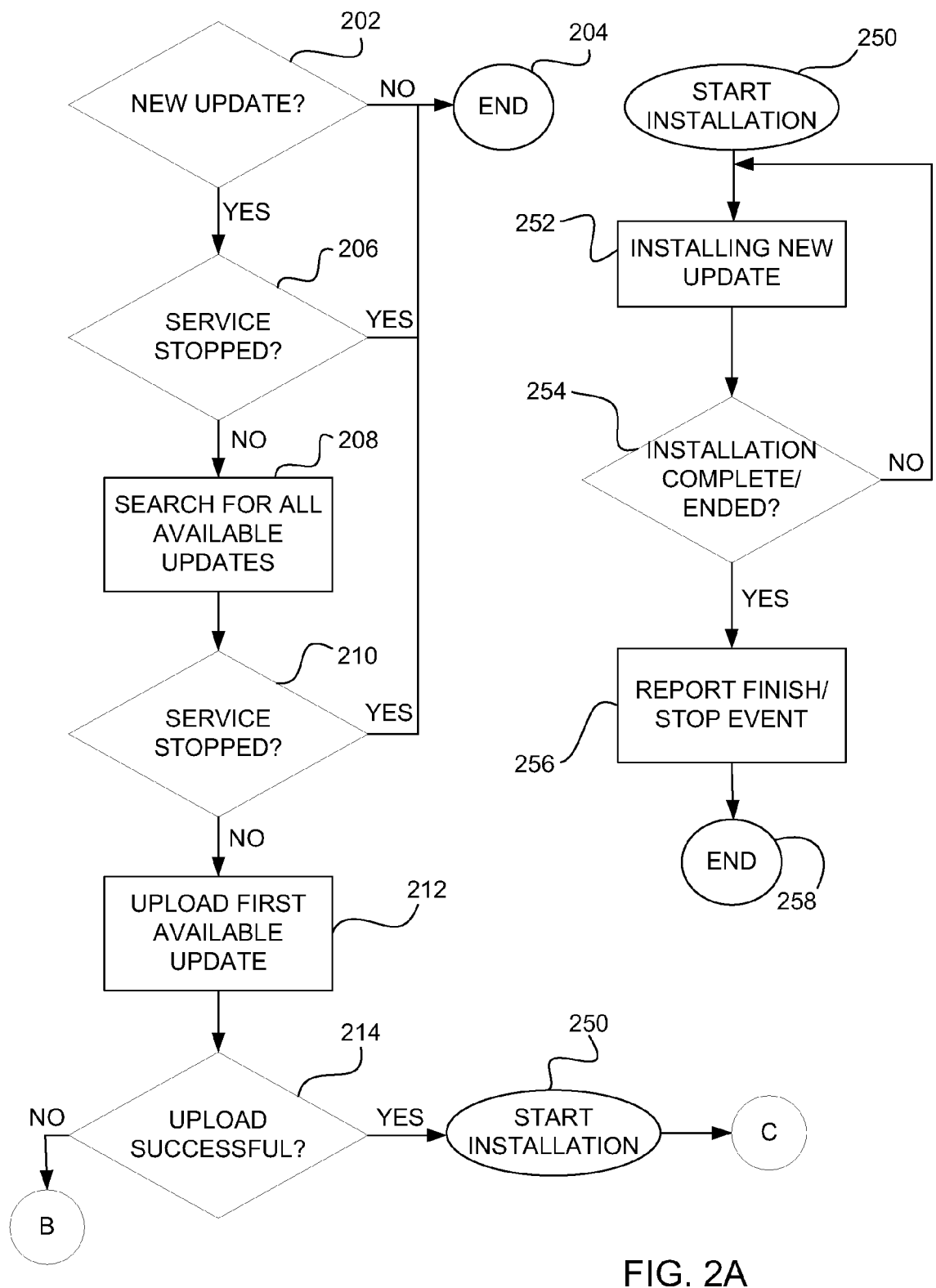
FIGS. 2A-2B illustrate an embodiment logic flow for installing updates to a software anti-piracy system.
Figure 2B:
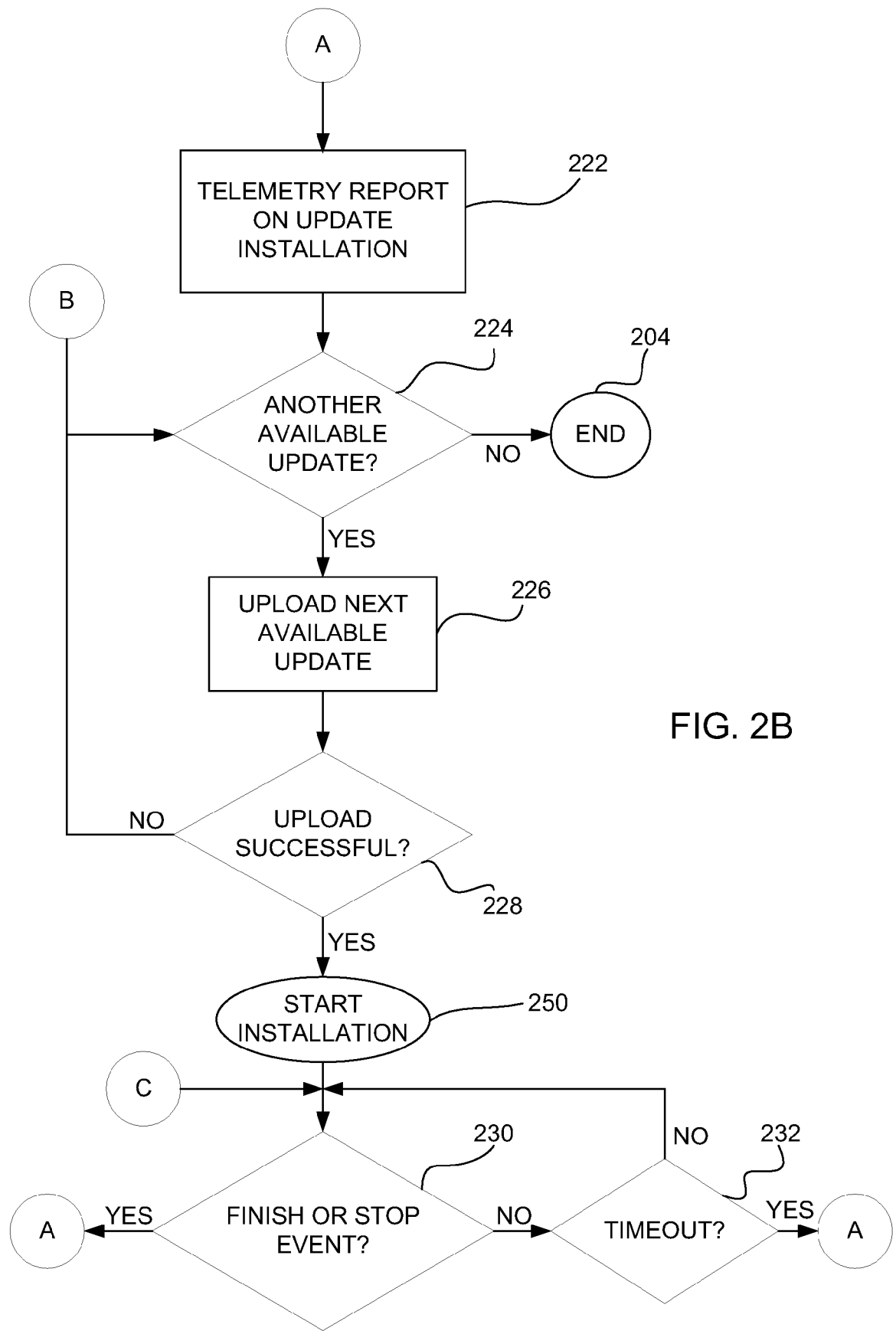

FIGS. 2A and 2B illustrate an embodiment logic flow for installing one or more new hack signatures, i.e., performing an update service. While the following discussion is made with respect to systems portrayed herein the operations described may be implemented in other systems. Further, the operations described herein are not limited to the order shown. Additionally, in other alternative embodiments more or fewer operations may be performed.

Referring to FIG. 2A, at decision block 202 a determination is made as to whether or not there is at least one new hack signature available for use with a protected software package. In an embodiment the process of determining whether or not there are new hack signatures available for upload and installation is periodic and automatic. In an embodiment the period for determining whether or not there are new hack signatures available for upload and installation is once every twenty-four (24) hours. In other embodiments the period for determining whether or not there are new hack signatures available for upload and installation is other time frames, e.g., once every six (6) hours, once every forty (40) hours, etc.

In an embodiment, if at decision block 202 it is determined that there are no new hack signatures currently available for use with a protected software package, the process ends 204.

In an embodiment at decision block 206 a determination is made as to whether or not the update service has been stopped by a user. In an embodiment a user can deny a hack signature upload and installation, i.e., a hack signature update, or otherwise stop the hack signature update. If a user does deny, or otherwise stop, the hack signature upload and installation the process ends 204.

If, however, the user has not denied, or otherwise, stopped hack signature upload and installation a search is made for all new available hack signatures 208. At decision block 210 a determination is once again made as to whether or not the update service has been stopped by a user. If yes, the process ends 204.

If one or more new available hack signatures are identified and the user has not denied, or otherwise stopped, the hack signature update, a first new available hack signature is uploaded to the system 212. At decision block 214 a determination is made as to whether the current new hack signature was successfully uploaded. If yes, an installation process will be started 250, for installing the newly uploaded hack signature.

If at decision block 214 it is determined that the current new hack signature failed to upload successfully, referring to FIG. 2B, at decision block 224 a determination is made as to whether or not there is another new available hack signature. If no, the process ends 204. If at decision block 224 there is another new available hack signature, this next new available hack signature is uploaded to the system 226. At decision block 228 a determination is made as to whether this new current hack signature was successfully uploaded. If yes, the installation process will be started 250, for installing the newly uploaded hack signature.

If at decision block 228 it is determined that the new hack signature failed to upload successfully, at decision block 224 a determination is again made as to whether or not there is yet another new available hack signature.

Referring to FIG. 2A, upon the installation process being started 250, the newly uploaded hack signature will then be installed 252. At decision block 254 a determination is made as to whether or not the installation of the newly uploaded hack signature completed, or was otherwise ended or terminated 254. If no, the installation continues 252. If, however, at decision block 254 it is determined that the current hack signature installation is complete, or has otherwise been ended or terminated, the correct finalization event, e.g., complete, terminated, etc., is reported 256 and the installation process is ended 258.

Once the installation process 250 is initiated, referring to FIG. 2B, at decision block 230 a determination is made as to whether or not the installation is complete, or otherwise stopped or terminated. If the installation process is not complete at decision block 232 a determination is made as to whether or not a timeout has occurred. If no timeout, the update process remains in a loop waiting for the installation to complete, or otherwise stop or terminate, 230 or a timeout to occur 232.

In an embodiment once the installation of the current hack signature is complete, or otherwise stopped or terminated, telemetry is reported and stored on the current hack signature upload and installation 222. Then, again at decision block 224 a determination is made as to whether or not there is another new available hack signature to be installed.

FIGS. 3A, 3B, 3C, 3D, 3E, 3F and 3G illustrate an embodiment logic flow for anti-piracy protection of licensing aspects of protected software packages. While the following discussion is made with respect to systems portrayed herein the operations described may be implemented in other systems. Further, the operations described herein are not limited to the order shown. Additionally, in other alternative embodiments more or fewer operations may be performed.

Figure 3A:
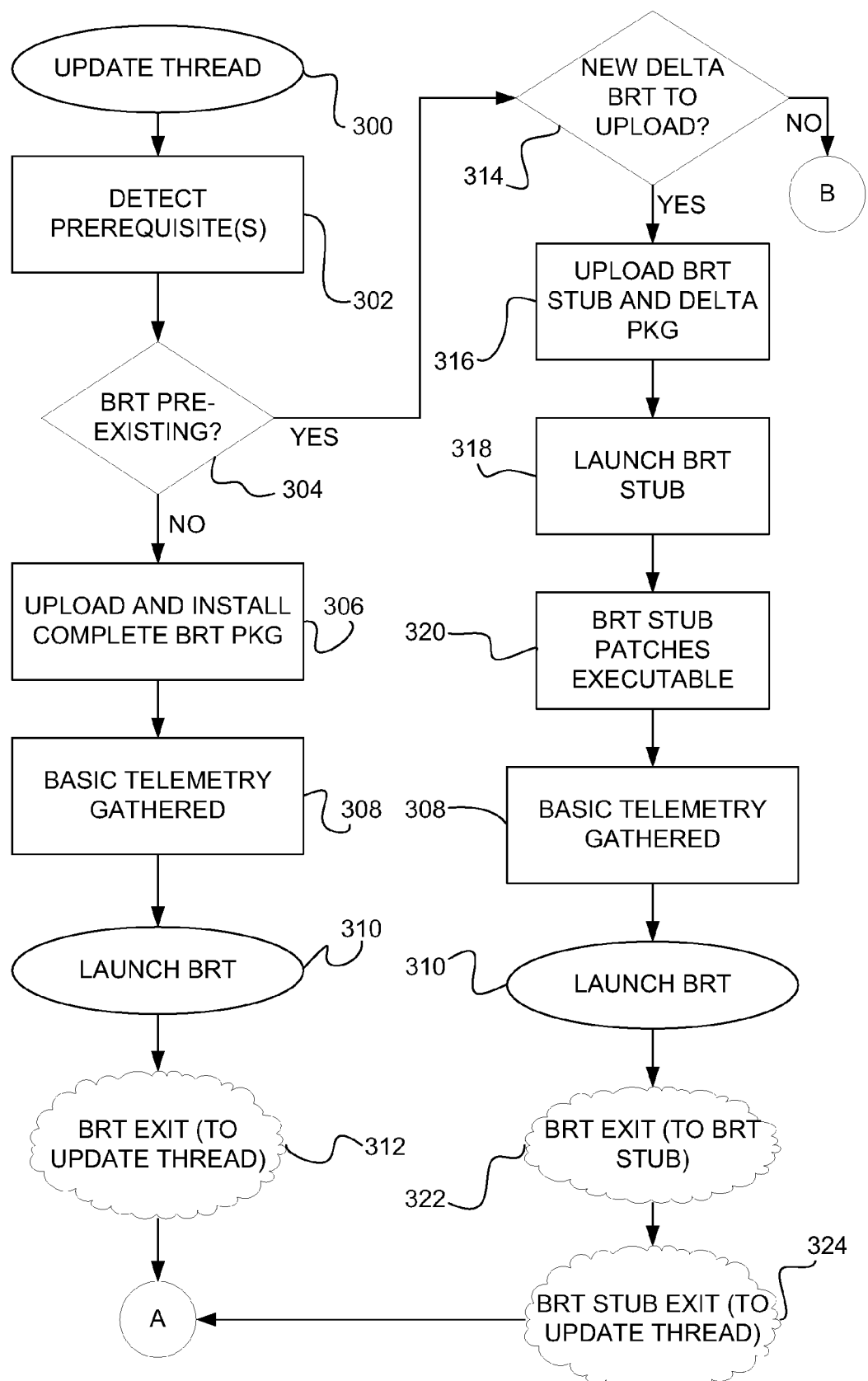
FIGS. 3A-3G illustrate an embodiment logic flow for an embodiment software anti-piracy system.

Referring to FIG. 3A, an update thread begins, or otherwise starts or initiates, 300. In an embodiment the update thread begins on a predefined time interval. In an aspect of this embodiment the predefined time interval is once every 24 hours. In other aspects of this embodiment the predefined time interval is other time increments, e.g., once every eight (8) hours, once every forty (40) hours, etc. In an embodiment the update thread begins when a protected software package is installed on a user's computing device. In an alternative embodiment the update thread begins when a protected software package is activated or when the grace period for activation of an installed protected software package has expired.

In an embodiment the update thread uploads and installs software executables, i.e., a software executable suite or portions thereof, for providing automatic anti-piracy protection for licensing aspects of the protected software package on the respective computing device. In an embodiment the software executable suite for providing automatic anti-piracy protection for licensing aspects of protected software packages is the BRT 135 of the embodiment software anti-piracy system 100 depicted in FIG. 1.

In an embodiment the update thread confirms that any prerequisites to the software executable suite, herein referred to as the BRT, running correctly are installed on the computing device, and if missing, a notification is sent to the user recommending the prerequisites be installed 302.

At decision block 304 the update thread determines whether a BRT already exists, i.e., is installed, on the user's computing device. If no, the full, or complete, software executable suite, i.e., the full BRT, is uploaded and installed on the user's computing device 306. In an embodiment the full BRT is uploaded and installed 306 as needed, i.e., on an initial upload, when it is deemed that any prior uploaded BRT on the computing device is corrupted to the extent that a full upload be performed, etc.

In an embodiment basic telemetry about the BRT upload and installation is gathered for storage 308. In an embodiment the basic telemetry includes information on the upload of the BRT. In an embodiment the basic telemetry upload information includes the number of upload attempts of the BRT, the number of upload failures for the BRT and whether or not there was a successful upload of the BRT. In an embodiment the basic telemetry includes information on the installation of the BRT. In an embodiment the basic telemetry installation information includes the number of installation attempts and a return code, or codes, providing identifying information about any installation failures and any successful installation. In alternative embodiments the basic telemetry includes additional information, a subset of the upload and/or installation information, or different information.

If properly installed, the BRT is launched, or otherwise initiated to run, 310. In an embodiment, once run the BRT exits to the update thread 312. In an embodiment, if the BRT is not properly installed, the update thread retains control.

At decision block 304, if it is determined that a BRT already is installed on the user's computing device, at decision block 314 a determination is made as to whether or not a new delta, or partial, BRT exits for upload. If yes a delta portion of the BRT is uploaded and installed on the user's computing device 316. In an embodiment a delta BRT is uploaded and installed 316 when, e.g., there is an update to a subset of the BRT, e.g., there are one or more new hack signatures, etc., a defined subset of the BRT is deemed corrupted, etc. In an embodiment a stub executable is uploaded with the delta BRT 316. In an embodiment the stub executable operates to install the delta BRT.

Once installed, the stub executable is launched, or otherwise initiated to run, 318. In an embodiment the stub executable then patches, or otherwise updates, the previously installed BRT with the delta BRT that has just been uploaded 320.

In an embodiment basic telemetry about the delta BRT upload and installation is gathered for storage 308. In an embodiment the basic telemetry includes information on the BRT delta upload. In an embodiment the basic telemetry upload information includes the number of upload attempts of the delta BRT, the number of upload failures for the delta BRT and whether or not there was a successful upload of the delta BRT. In an embodiment the basic telemetry includes information on the installation of the delta BRT. In an embodiment the basic telemetry installation information includes the number of delta BRT installation attempts and a return code, or codes, providing identifying information about any installation failures and any successful installation. In alternative embodiments the basic telemetry includes additional information, a subset of the upload and/or installation information, or different information.

In an embodiment, once the BRT is successfully patched, or otherwise updated, with the delta BRT, the stub executable launches, or otherwise initiates to run, the newly patched BRT 310. In an embodiment, once run the BRT exits to the stub executable 322. In an embodiment, if the delta BRT is not properly installed, the stub executable retains control.

In an embodiment the stub executable exits to the update thread 324.

Figure 3B:
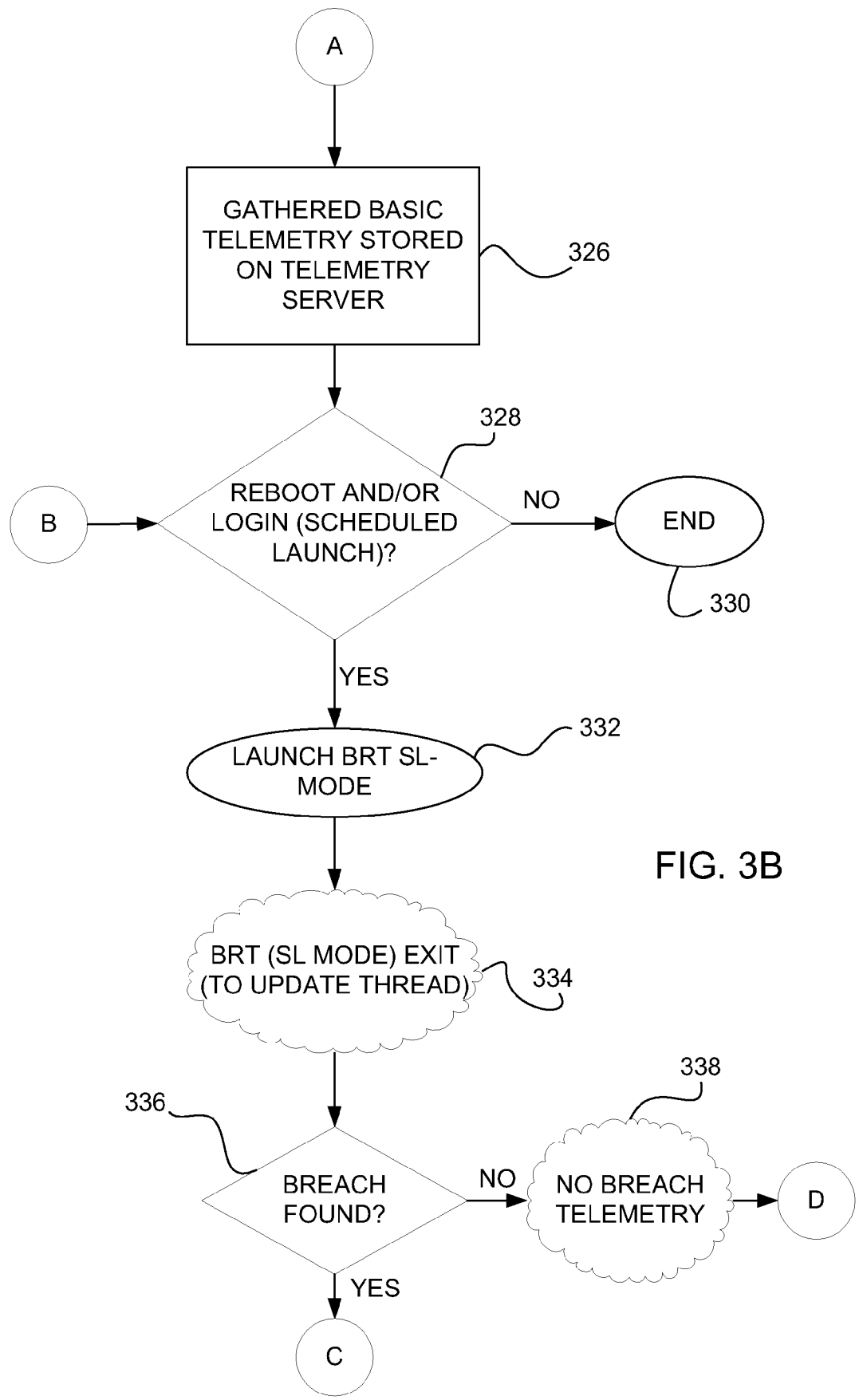
Figure 3C:
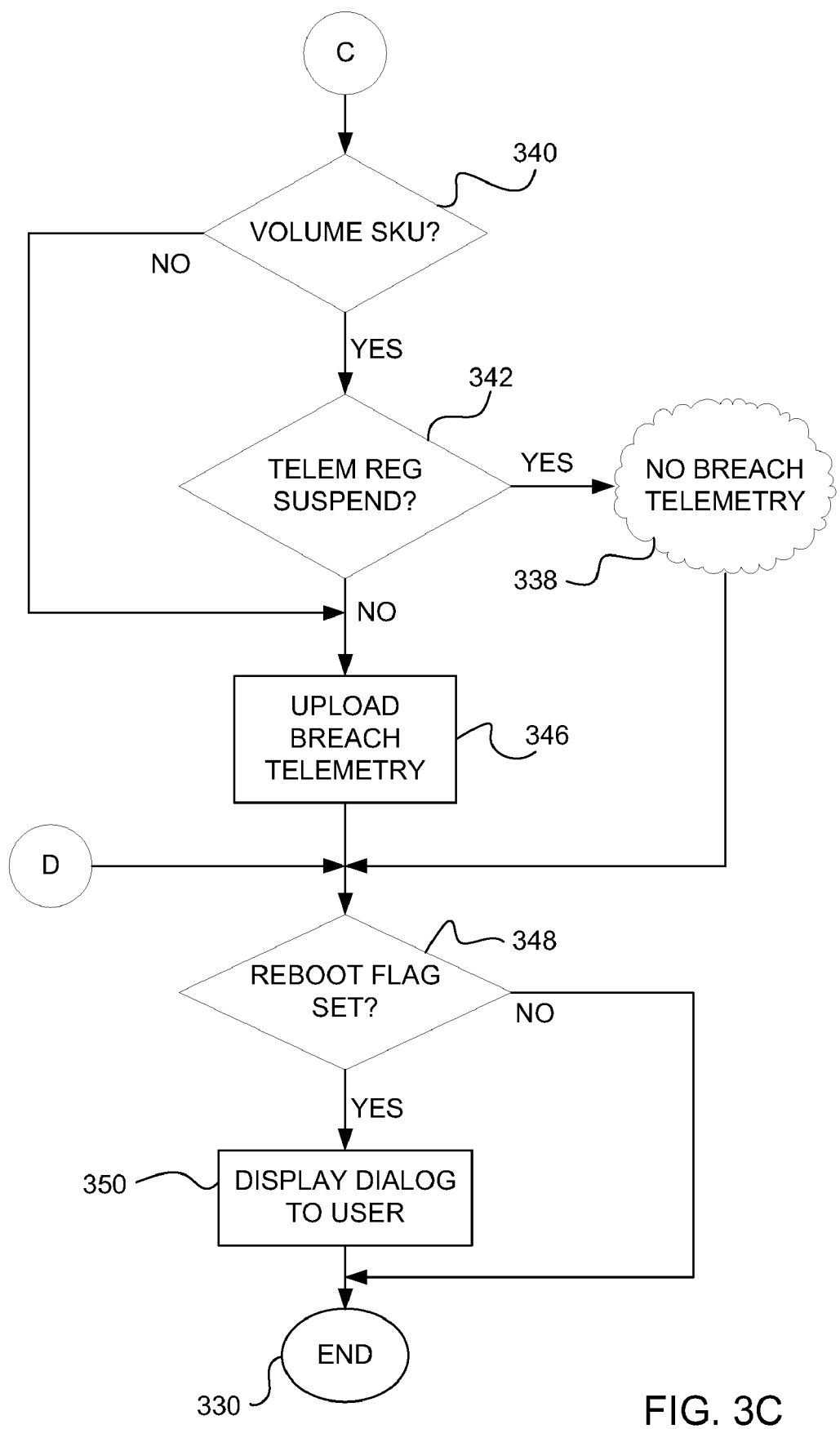

Referring to FIG. 3B, in an embodiment once control is returned to the update thread the gathered basic telemetry is stored on a telemetry server 326, e.g., the telemetry server 160 of the embodiment software anti-piracy system of FIG. 1.

In an embodiment at decision block 328 a determination is made as to whether a reboot has been indicated by the BRT and/or there is a current user logon, i.e., whether or not there is a scheduled launch of the existing BRT. If no, the update thread ends 330.

If there is a scheduled launch of the BRT, the update thread launches, or otherwise initiates to run, the BRT in SL (scheduled launch) mode 332. In an embodiment once run the BRT in SL mode exits to the update thread 334. Thereafter, at decision block 336 a determination is made as to whether or not the BRT identified one or more breaches, or software exploits. If no, no breach telemetry has been gathered or need be stored 338. If, however, the BRT did identify one or more breaches during its last launch, referring to FIG. 3C, at decision block 340 a determination is made as to whether or not the current license is part of a volume SKU. If yes, at decision block 342 a determination is made as to whether an administrator of the network hosting the volume SKU license has suspended telemetry reporting. If yes, no breach telemetry is to be stored 338. Otherwise, if the volume SKU license telemetry has not been suspended, in an embodiment any gathered telemetry on the breach identification, and possible removal, is uploaded to a telemetry server 346, e.g., the telemetry server 160 of the embodiment software anti-piracy system of FIG. 1.

At decision block 348 a determination is made as to whether or not the BRT set a reboot flag. If yes, in an embodiment a dialog box is posted to the user 350. Thereafter, the current update thread processing ends 330.

In an embodiment the dialog box informs the user that one or more breaches, i.e., software exploits, were found in the licensing aspects of the protected software package and that the protected software package is not genuine. In an embodiment the dialog box is presented to the user because one or more breaches were discovered by the BRT but the user declined to allow the breaches to be removed, or otherwise fixed. In an embodiment the dialog box is presented to the user because one or more breaches were discovered by the BRT but the BRT was unsuccessful in removing, or otherwise fixing, at least one of the discovered breaches.

Figure 3D:
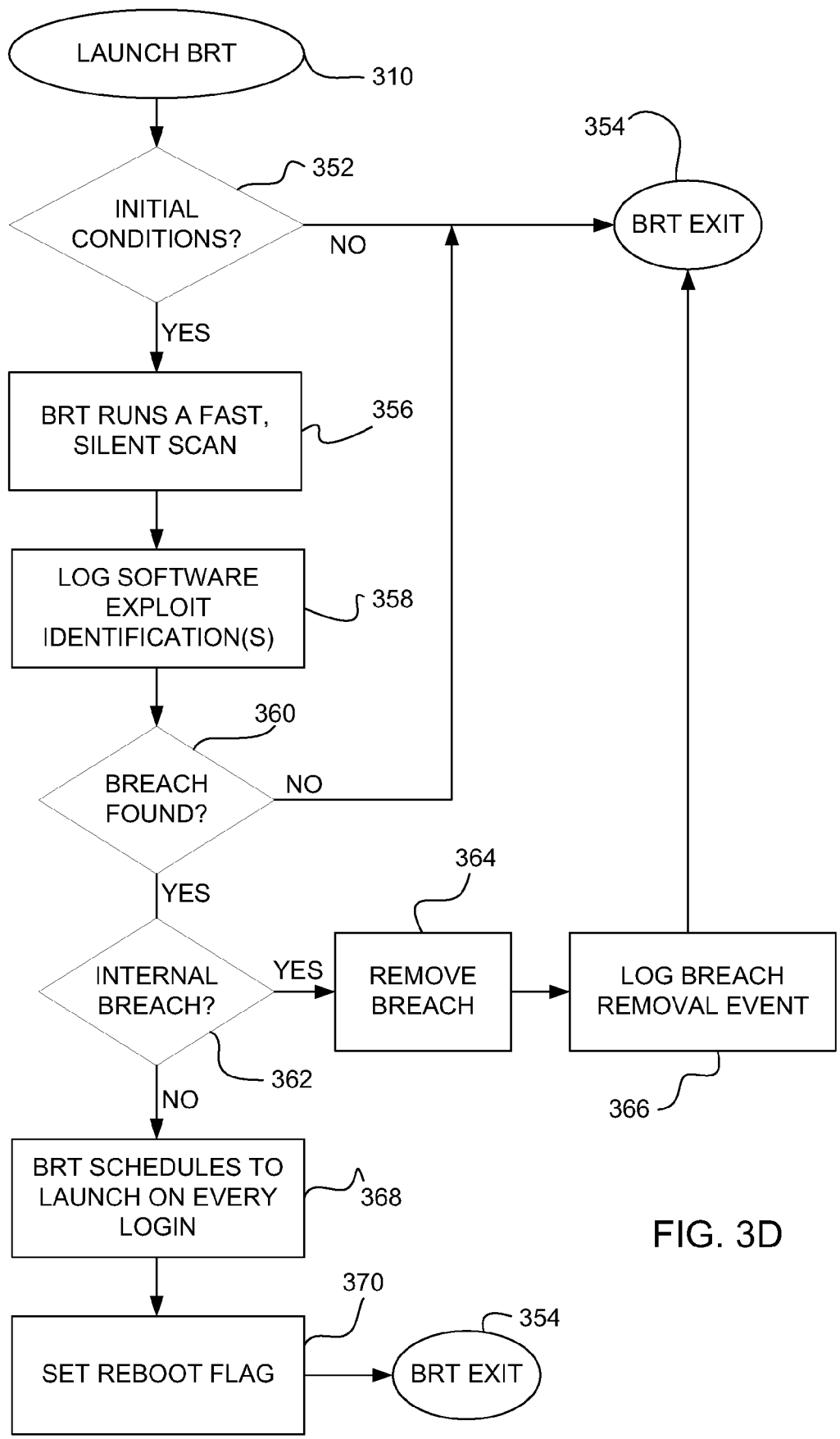

Referring to FIG. 3D, in an embodiment BRT launch 310 the BRT, at decision block 352, verifies initial condition(s). In an embodiment an initial condition is whether or not there is only one instance of the BRT currently running. In an embodiment only one instance of the BRT is to be run at any one time. In an embodiment, if there is more than one instance of the BRT currently running the current BRT process exits 354.

In an embodiment another initial condition is whether or not the BRT is running on the correct operating system version. If no, the current BRT process exits 354.

In an embodiment another initial condition is whether prescribed prerequisites have been installed on the user's computing device. If no, the current BRT process exits 354.

In alternative embodiments more, less or different initial conditions are verified 352 prior to the BRT executing to look for breaches, or software exploits.

In an embodiment, if all the initial conditions are verified as existing, the BRT runs a fast, i.e., as quickly as possible, silent scan of the protected software package licensing components for known software exploits and associated Malware, collectively referred to herein as software exploits, 356. In an embodiment known software exploits are those defined in the hack signature database 134 of FIG. 1. In an embodiment a silent scan is one in which a user is not notified that the scan is being performed and no user input or action is required for the scan.

In an embodiment, if all the initial conditions are verified as existing, the BRT also runs a fast, silent scan of the embodiment software anti-piracy system components for known software exploits 356.

In an embodiment multiple software exploits can be found on a single user computing device during a single scan. In an embodiment the BRT assigns a unique identifier for each discovered software exploit and stores, or otherwise logs, the unique identifiers 358.

At decision block 360 a determination is made as to whether any breach, i.e., software exploit, was identified in the scan. If no the BRT process exits 354. Referring back to FIG. 3A, if the BRT exits to the stub executable, the stub executable exits to the update thread 324.

At decision block 362 a determination is made as to whether one or more internal breaches were identified by the BRT scan. In an embodiment an internal breach is a software exploit to a component of the software anti-piracy system, e.g., a breach to the BRT 135 itself, a breach to the validation provider component 125, etc. of FIG. 1. If one or more internal breaches were identified by the BRT, in an embodiment the BRT attempts to automatically remove, or otherwise disable or correct, each of the identified internal breaches 364. In an embodiment the BRT then logs breach removal telemetry regarding its attempt to remove, or otherwise disable or correct, each identified internal breach 366. The BRT process then exits 354.

In an embodiment breach removal telemetry includes information about each identified internal breach and status on the BRT's attempt to remove, or otherwise disable or correct, each identified internal breach. In other embodiments breach removal telemetry includes additional information, a subset of this information, or different information.

If at decision block 362 it is determined that the identified breach(es) are external, then in an embodiment the BRT schedules to thereafter launch on user logon, i.e., enters an SL mode, 368. In an embodiment an external breach is a software exploit to a licensing component of a protected software package hosted, or otherwise accessible, by a user's computing device, e.g., a breach to the product key of the protected software package, a breach to the grace activation mechanism for the protected software package, etc.

In an embodiment when one or more external breaches have been identified the BRT notifies the update thread to reboot 370. Instructing the update thread to cause a reboot ensures a timely subsequent logon at which time the scheduled launch of the BRT will occur.

In an embodiment the BRT process thereafter exits 354.

Figure 3E:
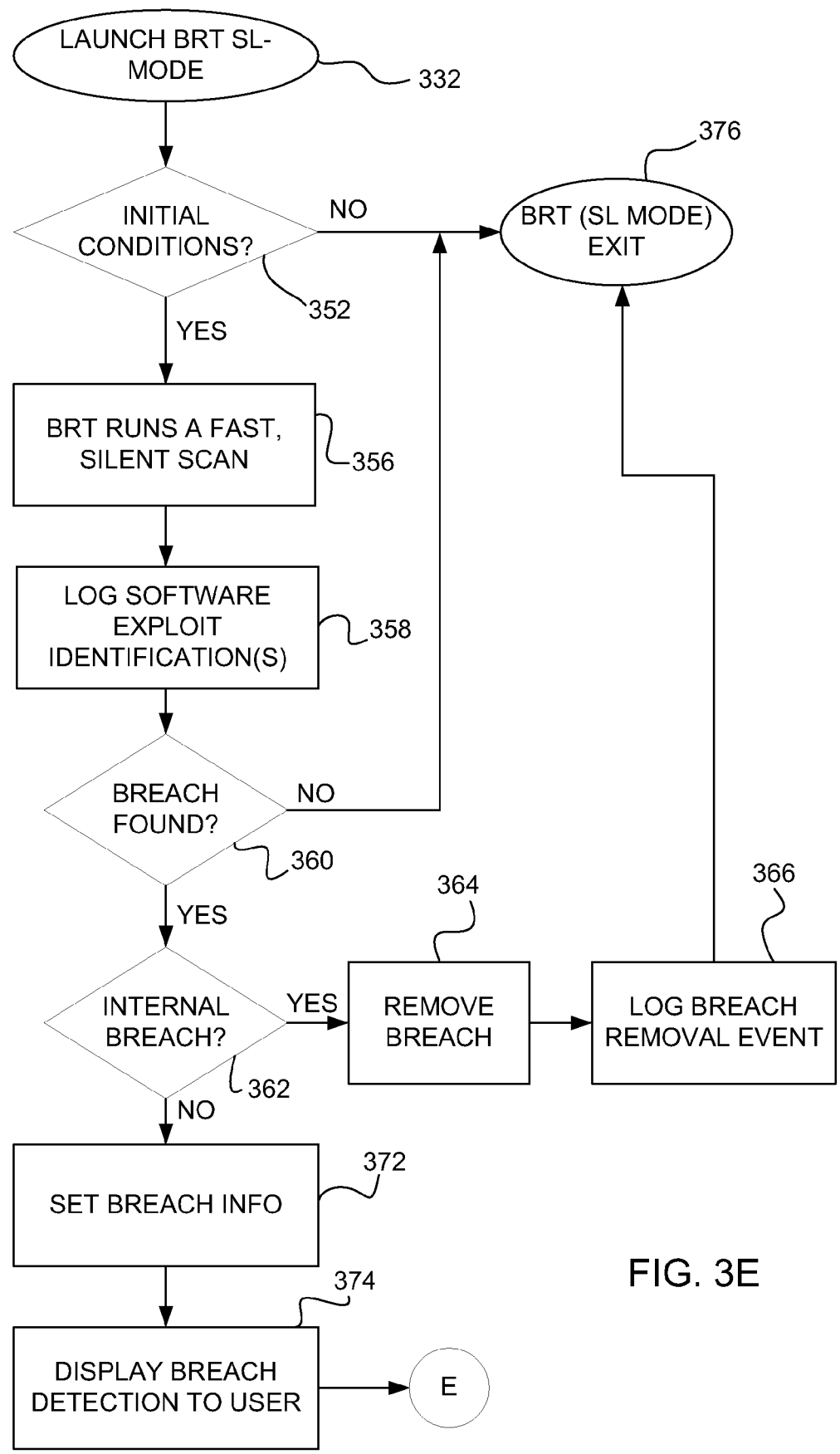

Referring to FIG. 3E, in an embodiment BRT launch in SL (scheduled launch) mode 332 the BRT, at decision block 352, verifies initial condition(s). In an embodiment an initial condition is whether or not there is only one instance of the BRT currently running. In an embodiment only one instance of the BRT is to be run at any one time. In an embodiment, if there is more than one instance of the BRT currently running the current BRT in SL mode process exits 376.

In an embodiment another initial condition is whether or not the BRT is running on the correct operating system version. If no, the current BRT in SL mode process exits 376.

In an embodiment another initial condition is whether the prescribed prerequisites have been installed on the user's computing device. If no, the current BRT in SL mode process exits 376.

In alternative embodiments more, less or different initial conditions are verified 352 prior to the BRT executing to look for breaches, or software exploits.

In an embodiment, if all prescribed initial conditions are verified as existing, the BRT runs a fast, i.e., as quickly as possible, silent scan of the protected software package licensing components for known software exploits and associated Malware, collectively referred to herein as software exploits, 356. In an embodiment known software exploits are those defined in the hack signature database 134 of FIG. 1. In an embodiment a silent scan is one in which a user is not notified that the scan is being performed and no user input or action is required for the scan.

In an embodiment, if all prescribed initial conditions are verified as existing, the BRT also runs a fast, silent scan of the embodiment software anti-piracy system components for known software exploits 356.

In an embodiment the BRT assigns a unique identifier for each discovered software exploit and stores, or otherwise logs, the unique identifiers 358.

At decision block 360 a determination is made as to whether any breach, i.e., software exploit, was identified in the scan. If no the BRT in SL mode process exits 376.

At decision block 362 a determination is made as to whether one or more internal breaches were identified by the BRT scan. As noted, in an embodiment an internal breach is a software exploit to a component of the software anti-piracy system. If one or more internal breaches were identified by the BRT, in an embodiment the BRT attempts to automatically remove, or otherwise disable or correct, each of the identified internal breaches 364. In an embodiment the BRT then logs breach removal telemetry regarding its attempt to remove, or otherwise disable or correct, each identified internal breach 366. The BRT in SL mode process then exits 376.

In an embodiment breach removal telemetry includes information about each identified internal breach and status on the BRT's attempt to remove, or otherwise disable or correct, each identified internal breach. In other embodiments breach removal telemetry includes additional information, a subset of this information, or different information.

If at decision block 362 it is determined that the identified breach(es) are external, then in an embodiment the BRT sets breach information regarding each of the identified external breaches 372. In an embodiment the BRT then displays breach detection information, generated by the set breach information, to a user of the computing device 374. In an embodiment the displayed breach detection information includes a dialog that the protected software package has been identified as non-genuine, i.e., it has one or more known software exploits to its licensing aspects.

Figure 3F:
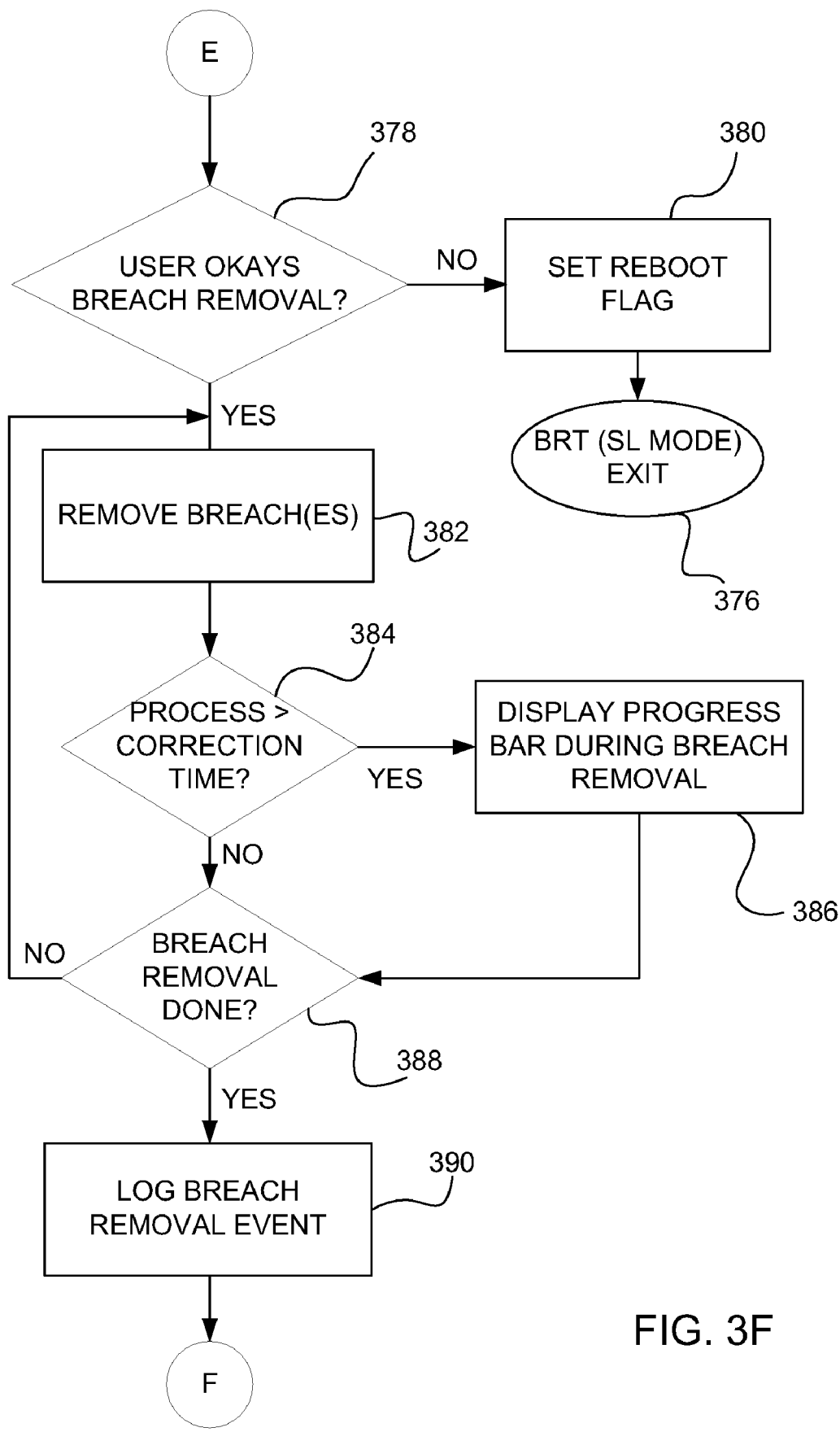

Referring to FIG. 3F, in an embodiment at decision block 378 the user is asked whether they will allow the removal, or otherwise the disablement or correction, of the identified external breaches. If no, a reboot flag is set 380 and the current BRT in SL mode process is ended 376.

If the user provides approval for the correction of identified external breaches the BRT attempts to remove, or otherwise disable or correct, each of the identified external breaches 382. At decision block 384 a determination is made as to whether or not the corrections, or other BRT actions, regarding identified external breaches are taking longer than a predefined correction time. In an embodiment the predefined correction time is two (2) seconds. In other embodiments the predefined correction time is other time intervals, e.g., five (5) seconds, one (1) minute, one (1) second, etc.

If the BRT action regarding the identified external breaches is taking longer than the predefined correction time, then in an embodiment a progress bar, or other progress indicator, is displayed to the user 386 to indicate where in the process the BRT currently is.

At decision block 388 a determination is made as to whether or not the BRT has finalized the appropriate remedial actions for the identified external breaches. If no, the BRT continues to remove, or otherwise disable or correct, the identified external breaches 382. If however the BRT has finalized the appropriate remedial actions for the identified external breaches then in an embodiment the BRT logs breach removal telemetry regarding its attempt to remove, or otherwise disable or correct, each identified external breach 390.

In an embodiment breach removal telemetry includes information about each identified external breach and status on the BRT's attempt to remove, or otherwise disable or correct, each identified external breach. In other embodiments breach removal telemetry includes additional information, a subset of this information, or different information.

Figure 3G:
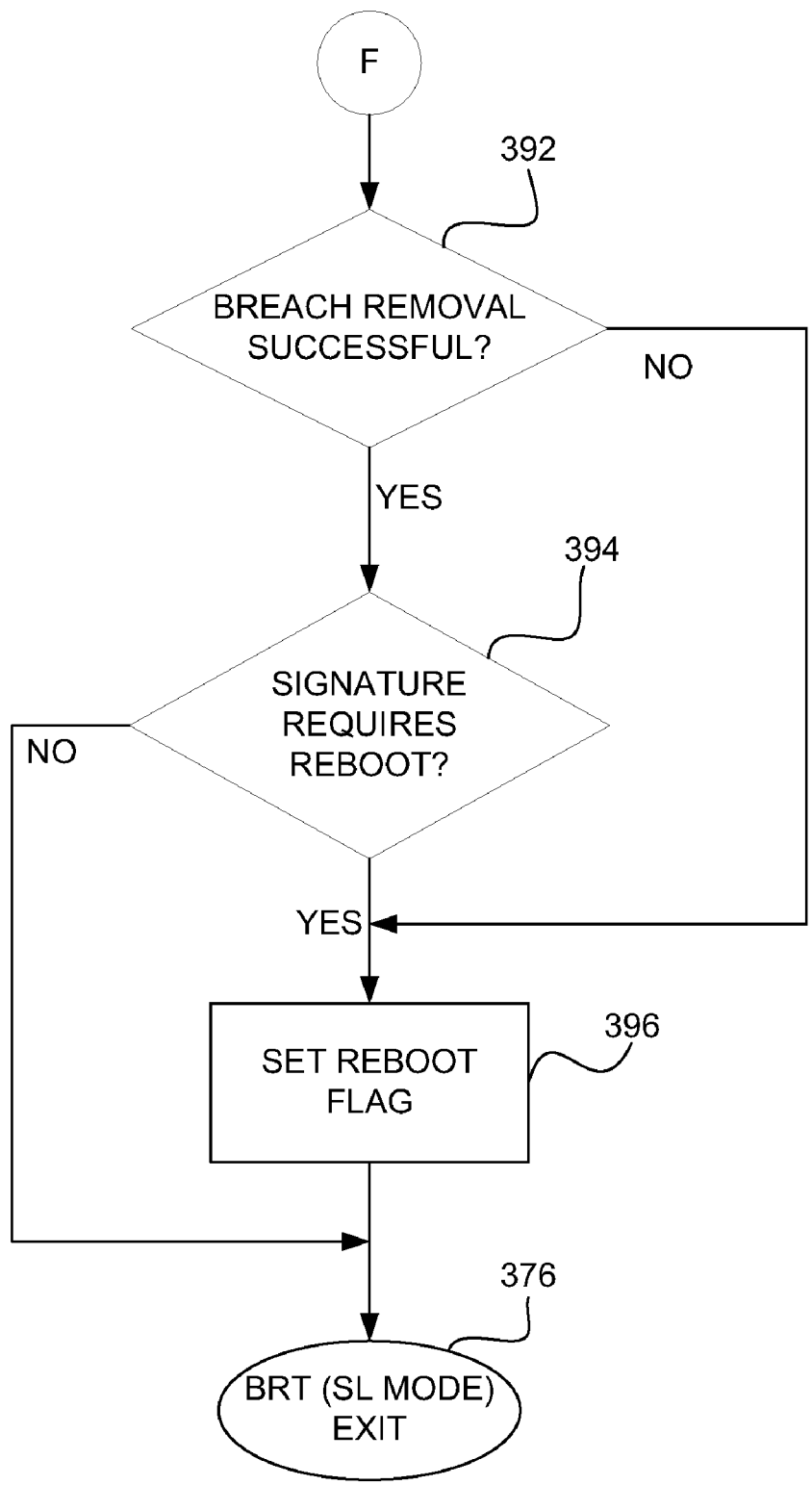

Referring to FIG. 3G, at decision block 392 a determination is made as to whether or not all external breaches, or software exploits, were successfully removed, or otherwise disabled or corrected. If yes, at decision block 394 a determination is made as to whether or not any hack signature used for removing, or otherwise disabling or correcting, any identified external breach indicates a reboot should be performed. If yes a reboot flag is set 396. The reboot flag is also set 396 if any of the identified external breaches were not successfully removed, or otherwise disabled or corrected.

Whether or not a reboot flag is set, the BRT in SL mode process then exits 376.

Computing Device System Configuration

Figure 4:
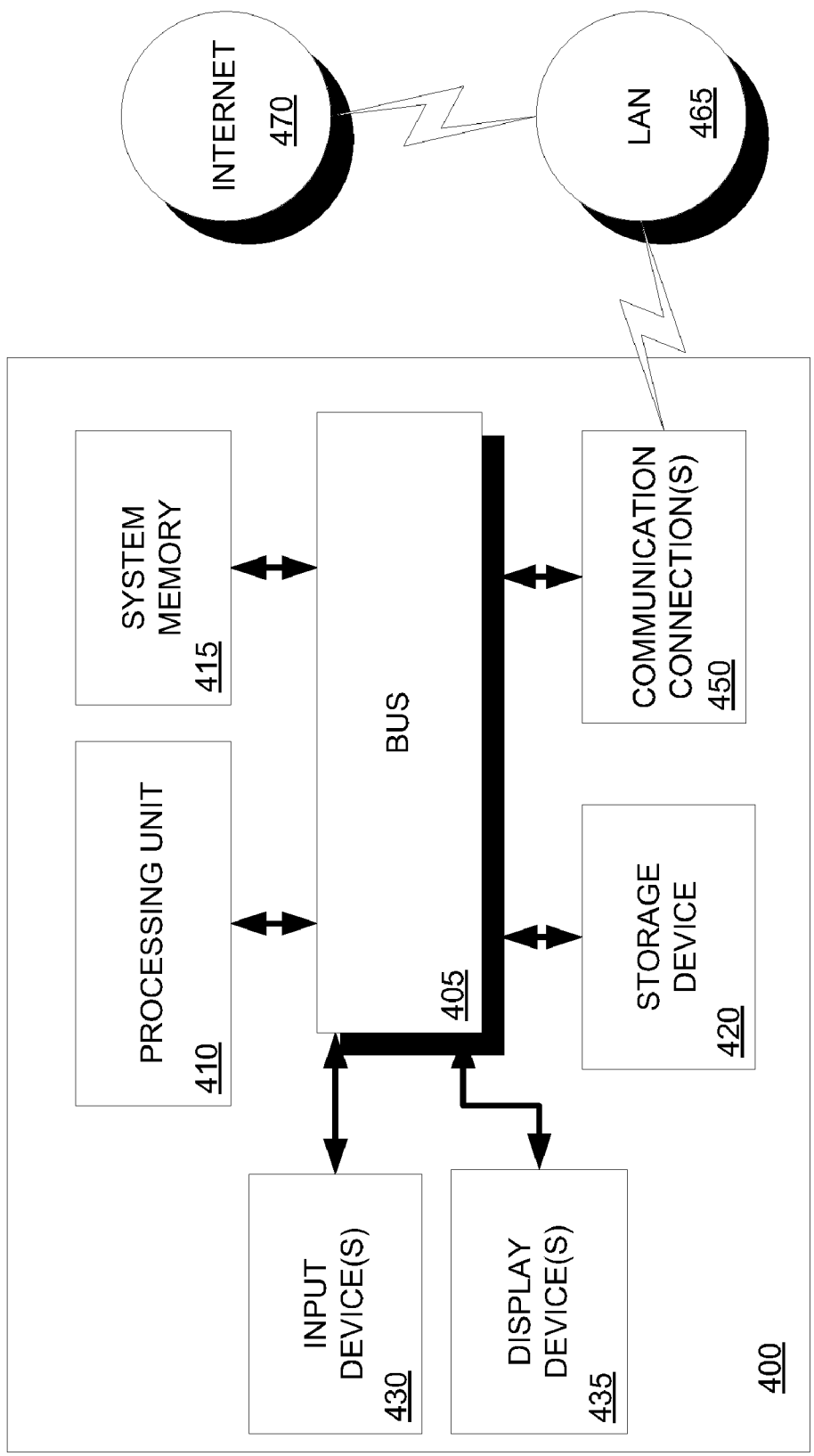
FIG. 4 is a block diagram of an exemplary basic computing device system that can process software, i.e., program code, or instructions.

FIG. 4 is a block diagram that illustrates an exemplary computing device system 400 upon which an embodiment can be implemented. The computing device system 400 includes a bus 405 or other mechanism for communicating information, and a processing unit 410 coupled with the bus 405 for processing information. The computing device system 400 also includes system memory 415, which may be volatile or dynamic, such as random access memory (RAM), non-volatile or static, such as read-only memory (ROM) or flash memory, or some combination of the two. The system memory 415 is coupled to the bus 405 for storing information and instructions to be executed by the processing unit 410, and may also be used for storing temporary variables or other intermediate information during the execution of instructions by the processing unit 410. The system memory 415 often contains an operating system and one or more programs, and may also include program data.

In an embodiment, a storage device 420, such as a magnetic or optical disk, is also coupled to the bus 405 for storing information, including program code comprising instructions and/or data.

The computing device system 400 generally includes one or more display devices 435, such as, but not limited to, a display screen, e.g., a cathode ray tube (CRT) or liquid crystal display (LCD), a printer, and one or more speakers, for providing information to a computing device user. The computing device system 400 also generally includes one or more input devices 430, such as, but not limited to, a keyboard, mouse, trackball, pen, voice input device(s), and touch input devices, which a computing device user can use to communicate information and command selections to the processing unit 410. All of these devices are known in the art and need not be discussed at length here.

The processing unit 410 executes one or more sequences of one or more program instructions contained in the system memory 415. These instructions may be read into the system memory 415 from another computing device-readable medium, including, but not limited to, the storage device 420. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 410 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 415 and storage device 420 of the computing device system 400 are further examples of storage media. Examples of transmission media include, but are not limited to, wired media such as coaxial cable(s), copper wire and optical fiber, and wireless media such as optic signals, acoustic signals, RF signals and infrared signals.

The computing device system 400 also includes one or more communication connections 450 coupled to the bus 405. The communication connection(s) 450 provide a two-way data communication coupling from the computing device system 400 to other computing devices on a local area network (LAN) 465 and/or wide area network (WAN), including the World Wide Web, or Internet 470. Examples of the communication connection(s) 450 include, but are not limited to, an integrated services digital network (ISDN) card, modem, LAN card, and any device capable of sending and receiving electrical, electromagnetic, optical, acoustic, RF or infrared signals.

Communications received by the computing device system 400 can include program instructions and program data. The program instructions received by the computing device system 400 may be executed by the processing unit 410 as they are received, and/or stored in the storage device 420 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for implementing anti-piracy for licensing components of a software package operating via a user computing device, the method comprising:
    automatically uploading anti-piracy software for identifying and correcting known software exploits;
    automatically scanning for at least one software exploit in at least one licensing component of the software package;
    identifying a software exploit in a licensing component of the software package;
    requesting user approval to correct the licensing component of the software package in which the software exploit is identified; and
    attempting to correct, upon user approval, the licensing component of the software package in which the software exploit is identified, the attempting to correct the licensing component including preventing the software exploit in the licensing component from operating as designed.

2. The method for implementing anti-piracy of claim 1, wherein the anti-piracy software for identifying and correcting known software exploits comprises a breach removal tool and wherein the breach removal tool comprises an executable for identifying software exploits to one or more licensing components of the software package, an executable for correcting at least one software exploit from operating as designed with at least one licensing component of the software package, and a collection of one or more hack signatures, wherein each hack signature is used to identify at least one software exploit and each hack signature is used to disable at least one software exploit from operating as designed.

3. The method for implementing anti-piracy of claim 2, further comprising automatically uploading delta anti-piracy software for identifying and correcting known software exploits wherein the delta anti-piracy software comprises a delta breach removal tool and wherein the delta breach removal tool comprises at least one new hack signature to be included with the collection of one or more hack signatures.

4. The method for implementing anti-piracy of claim 2, wherein attempting to correct at least one software exploit from operating as designed comprises removing the software exploit from the software package.

5. The method for implementing anti-piracy of claim 2, wherein attempting to correct at least one software exploit from operating as designed comprises disabling the software exploit from operating as designed.

6. The method for implementing anti-piracy of claim 1, further comprising:
gathering identification telemetry on the identified software exploit; and
gathering correction telemetry on the attempted correction of the licensing component of the software package, wherein the gathered correction telemetry comprises an indication on whether the identified software exploit was successfully disabled from operating as designed.

7. The method for implementing anti-piracy of claim 1 further comprising scanning for at least one software exploit in the anti-piracy software.

8. The method for implementing anti-piracy of claim 7, further comprising:
identifying a software exploit in the anti-piracy software;
gathering identification telemetry on the identified software exploit in the anti-piracy software;
automatically attempting to correct the identified software exploit in the anti-piracy software to disable the identified software exploit in the anti-piracy software from operating as designed; and
gathering correction telemetry on the attempted correction of the anti-piracy software, wherein the gathered correction telemetry on the attempted correction of the anti-piracy software comprises an indication on whether the identified software exploit in the anti-piracy software was successfully disabled from operating as designed.

9. The method for implementing anti-piracy of claim 1 further comprising posting a dialog that comprises a notification that the software package is not genuine when the user denies an attempted correction of the licensing component of the software package.

10. The method for implementing anti-piracy of claim 1 further comprising posting progress status on the attempted correction of the licensing component of the software package when the attempt to correct the licensing component of the software package takes longer than a predefined time limit.

11. A method for anti-piracy protection for licensing, the method comprising:
on a first instance, automatically uploading to a user computing device a breach removal tool for identifying and correcting known software exploits;
on a second instance, automatically uploading a delta breach removal tool to the user computing device;
identifying a first software exploit in a licensing component of a software package executable via the user computing device;
attempting to correct the licensing component of the software package to disable the identified first software exploit;
providing telemetry on the identified first software exploit to a server;
providing telemetry on the attempted correction of the licensing component of the software package to disable the identified first software exploit to the server;
identifying a second software exploit in the breach removal tool;
attempting to correct the breach removal tool to disable the identified second software exploit;
providing telemetry on the identified second software exploit to the server; and
providing telemetry on the attempted correction of the breach removal tool to disable the identified second software exploit to the server.

12. The method for anti-piracy protection for licensing of claim 11, further comprising:
automatically scanning for at least one software exploit in at least one licensing component of the software package; and
automatically scanning for at least one software exploit in the breach removal tool.

13. The method for anti-piracy protection for licensing of claim 11, wherein the breach removal tool comprises an executable for identifying at least one software exploit to at least one licensing component of a software package, an executable for correcting at least one software exploit from operating as designed with at least one licensing component of the software package, an executable for identifying at least one software exploit to the breach removal tool, an executable for correcting at least one software exploit from operating as designed with the breach removal tool, and a collection of one or more hack signatures, wherein each hack signature is used to identify at least one software exploit and each hack signature is used to disable at least one software exploit from operating as designed.

14. The method for anti-piracy protection for licensing of claim 13, wherein a delta breach removal tool comprises at least one new hack signature to be included with the collection of one or more hack signatures.

15. The method for anti-piracy protection for licensing of claim 11 further comprising posting progress status on the attempted correction of the licensing component of the software package when the attempt to correct the licensing component of the software package takes longer than a predefined time limit.

16. The method for anti-piracy protection for licensing of claim 11 further comprising:
requesting user approval for correction of the licensing component of the software package with an identified software exploit; and
attempting to correct the licensing component of the software package to disable the identified software exploit only upon user approval for correction of the licensing component of the software package.

17. The method for anti-piracy protection for licensing of claim 16 further comprising providing a notification that the software package is not genuine when a user denies an attempted correction of the licensing component of the software package.

18. A method for identifying and correcting hacked licensing components of a vendor software package on a user computing device, the method comprising:
on a first instance, automatically uploading a breach removal tool for identifying and correcting known software exploits, wherein the breach removal tool comprises an executable for identifying software exploits, an executable for correcting identified software exploits, and a collection of one or more hack signatures;
periodically checking if there is an update for the breach removal tool;
automatically uploading an update for the breach removal tool, wherein the update for the breach removal tool comprises a hack signature to be included with the collection of one or more hack signatures;

identifying a software exploit in a licensing component of the vendor software package using a hack signature of the collection of one or more hack signatures;

attempting to correct the licensing component of the software package to disable the identified software exploit using the hack signature of the collection of one or more hack signatures; and, collecting telemetry on the identified software exploit.

19. The method for identifying and correcting hacked licensing components of a vendor software package on a user computing device of claim 18, wherein at least once every twenty-four hours a check is made to identify any update for the breach removal tool.

20. The method for identifying and correcting hacked licensing components of a vendor software package on a user computing device of claim 18 further comprising providing a request for user approval for the correction of the licensing component of the software package to disable the identified software exploit.

* * * * *